US009576503B2

(12) United States Patent
Stephanian

(10) Patent No.: US 9,576,503 B2
(45) Date of Patent: Feb. 21, 2017

(54) SIMULATION CART

(71) Applicant: Seattle Children's Hospital, Seattle, WA (US)

(72) Inventor: Donald A. Stephanian, Issaquah, WA (US)

(73) Assignee: SEATTLE CHILDREN'S HOSPITAL, Seattle, WA (US)

(*) Notice: Subject to any disclaimer, the term of this patent is extended or adjusted under 35 U.S.C. 154(b) by 150 days.

(21) Appl. No.: 14/142,010

(22) Filed: Dec. 27, 2013

(65) Prior Publication Data
US 2015/0187231 A1  Jul. 2, 2015

(51) Int. Cl.
G09B 19/00 (2006.01)
G09B 23/30 (2006.01)
G09B 5/02 (2006.01)
B62B 3/00 (2006.01)
H04N 5/93 (2006.01)
H04N 5/77 (2006.01)
H04N 7/18 (2006.01)

(52) U.S. Cl.
CPC ............... *G09B 23/30* (2013.01); *B62B 3/00* (2013.01); *G09B 5/02* (2013.01); *H04N 5/77* (2013.01); *H04N 5/9305* (2013.01); *H04N 7/181* (2013.01)

(58) Field of Classification Search
USPC ........................................................ 434/267
See application file for complete search history.

(56) References Cited

U.S. PATENT DOCUMENTS

| RE32,219 E | 8/1986 | Garth |
| 4,797,104 A | 1/1989 | Laerdal et al. |
| 4,823,796 A | 4/1989 | Benson |
| 5,012,539 A | 5/1991 | Grigg |
| 5,055,052 A | 10/1991 | Johnsen |
| 5,097,830 A | 3/1992 | Eikefjord et al. |
| D326,522 S | 5/1992 | Arnoy et al. |
| 5,217,006 A | 6/1993 | McCulloch |
| 5,230,698 A | 7/1993 | Garth |

(Continued)

OTHER PUBLICATIONS

Weinstock, Peter H., "Simulation at the point of care: Reduced-cost, in situ training via a mobile cart," Pediatr Crit Care Med, 2009, 10(2):176-181.

*Primary Examiner* — Kesha Frisby
(74) *Attorney, Agent, or Firm* — Davis Wright Tremaine LLP; George C. Rondeau, Jr.; Heather M. Colburn

(57) ABSTRACT

A cart for transporting a simulation system configured to control a simulation manikin, a recording system configured to record information about a simulation session, and a playback display device configured to display a playback of the recorded information. The cart includes a cart body supported by a plurality of wheels, and a power supply coupled to the cart body. The cart body has an upper work surface, and an interior storage space configured to store the manikin. The work surface is configured to support user input devices configured to provide user input to the simulation system, and the recording system. The playback display device is mountable to first and second spaced apart upright support assemblies mounted on the cart body. The power supply is connectable to an external power source, and configured to provide power to the simulation manikin, the playback display device, and the simulation and recording systems.

7 Claims, 11 Drawing Sheets

(56) References Cited

U.S. PATENT DOCUMENTS

| | | |
|---|---|---|
| 5,256,070 A | 10/1993 | Garth et al. |
| 5,330,514 A | 7/1994 | Egelandsdal et al. |
| D350,563 S | 9/1994 | Eggert |
| D352,313 S | 11/1994 | Eggert |
| 5,468,151 A | 11/1995 | Egelandsdal et al. |
| 5,472,345 A | 12/1995 | Eggert |
| 5,531,769 A | 7/1996 | Fossan et al. |
| 5,620,326 A | 4/1997 | Younker |
| 5,672,179 A | 9/1997 | Garth et al. |
| 5,722,836 A | 3/1998 | Younker |
| D393,718 S | 4/1998 | Traut et al. |
| 5,792,032 A | 8/1998 | Williams et al. |
| 5,795,315 A | 8/1998 | Traut et al. |
| 5,800,179 A | 9/1998 | Bailey |
| 5,816,579 A | 10/1998 | Broussard |
| 5,823,787 A | 10/1998 | Gonzalez et al. |
| D403,423 S | 12/1998 | Bologovsky et al. |
| 5,853,292 A | 12/1998 | Eggert et al. |
| 5,950,627 A | 9/1999 | Bologovsky et al. |
| 5,951,301 A | 9/1999 | Younker |
| 5,971,398 A | 10/1999 | Broussard et al. |
| D416,297 S | 11/1999 | Eggert |
| 6,007,342 A | 12/1999 | Tjolsen |
| 6,033,349 A | 3/2000 | Farenholtz |
| 6,042,522 A | 3/2000 | Farenholtz |
| 6,062,865 A | 5/2000 | Bailey |
| 6,090,058 A | 7/2000 | Traut et al. |
| D434,141 S | 11/2000 | Randeberg et al. |
| 6,154,673 A | 11/2000 | Morgan et al. |
| 6,190,177 B1 | 2/2001 | Thu et al. |
| 6,193,519 B1 | 2/2001 | Eggert et al. |
| 6,227,864 B1 | 5/2001 | Egelandsdal et al. |
| 6,241,526 B1 | 6/2001 | Auran et al. |
| 6,267,599 B1 | 7/2001 | Bailey |
| 6,306,107 B1 | 10/2001 | Myklebust et al. |
| 6,336,047 B1 | 1/2002 | Thu et al. |
| 6,351,671 B1 | 2/2002 | Myklebust et al. |
| 6,397,104 B1 | 5/2002 | Miller et al. |
| 6,443,735 B1 | 9/2002 | Eggert et al. |
| 6,478,500 B1 | 11/2002 | Farenholtz |
| 6,503,087 B1 | 1/2003 | Eggert |
| 6,527,558 B1 | 3/2003 | Eggert et al. |
| 6,554,526 B1 | 4/2003 | Egelandsdal |
| D479,878 S | 9/2003 | Phillips et al. |
| 6,637,057 B2 | 10/2003 | Phillips et al. |
| 6,666,836 B1 | 12/2003 | Islava |
| 6,691,703 B2 | 2/2004 | McKinney et al. |
| 6,719,566 B2 | 4/2004 | Farenholtz et al. |
| 6,739,877 B2 | 5/2004 | Bailey et al. |
| 6,758,676 B2 | 7/2004 | Eggert et al. |
| 6,807,442 B1 | 10/2004 | Myklebust et al. |
| 6,892,134 B2 | 5/2005 | Lacey et al. |
| 6,918,771 B2 | 7/2005 | Arington et al. |
| 6,968,844 B2 | 11/2005 | Liland |
| 7,014,471 B2 | 3/2006 | Farenholtz et al. |
| 7,114,954 B2 | 10/2006 | Eggert et al. |
| 7,120,954 B2 | 10/2006 | Traut et al. |
| 7,192,284 B2 | 3/2007 | Eggert et al. |
| 7,255,565 B2 | 8/2007 | Keegan |
| 7,441,206 B2 | 10/2008 | MacPhee |
| 7,455,523 B2 | 11/2008 | Hendrickson et al. |
| 7,625,211 B2 | 12/2009 | Feygin et al. |
| D609,813 S | 2/2010 | Molden et al. |
| D614,634 S | 4/2010 | Nilsen |
| D614,859 S | 5/2010 | Hansen |
| D618,739 S | 6/2010 | Haug |
| 7,731,500 B2 | 6/2010 | Feygin et al. |
| D620,992 S | 8/2010 | Haug |
| 7,774,054 B2 | 8/2010 | Myklebust |
| 7,775,996 B2 | 8/2010 | Stromsnes |
| 7,802,991 B2 | 9/2010 | Liland et al. |
| 7,811,090 B2 | 10/2010 | Eggert et al. |
| D628,212 S | 11/2010 | Molden |
| 7,837,636 B2 | 11/2010 | Tjolsen et al. |
| 7,857,625 B2 | 12/2010 | Gomo |
| 7,862,340 B2 | 1/2011 | Chen et al. |
| D634,002 S | 3/2011 | Laerdal |
| 7,976,312 B2 | 7/2011 | Eggert et al. |
| 7,976,313 B2 | 7/2011 | Eggert et al. |
| 7,993,290 B2 | 8/2011 | Lund et al. |
| 8,002,720 B2 | 8/2011 | Hansen et al. |
| 8,007,451 B2 | 8/2011 | Havardsholm et al. |
| 8,016,598 B2 | 9/2011 | Eggert et al. |
| 8,034,006 B2 | 10/2011 | Celik-Butler et al. |
| 8,062,038 B2 | 11/2011 | Hendrickson et al. |
| 8,100,695 B2 | 1/2012 | Duprez et al. |
| 8,152,532 B2 | 4/2012 | Eggert et al. |
| 8,162,668 B2 | 4/2012 | Toly |
| 8,192,367 B2 | 6/2012 | Myklebust |
| D662,987 S | 7/2012 | Ianke |
| D667,057 S | 9/2012 | Ianke |
| D668,295 S | 10/2012 | Ianke |
| D669,130 S | 10/2012 | Ianke |
| 8,333,720 B2 | 12/2012 | Nysaether |
| 8,360,063 B2 | 1/2013 | Liland |
| D676,134 S | 2/2013 | Saevareid et al. |
| 8,394,040 B2 | 3/2013 | Strand et al. |
| 8,403,674 B2 | 3/2013 | Feygin et al. |
| 8,419,438 B2 | 4/2013 | Eggert et al. |
| 2002/0106619 A1 | 8/2002 | Farenholtz et al. |
| 2003/0073060 A1 | 4/2003 | Eggert et al. |
| 2003/0091968 A1 | 5/2003 | Eggert et al. |
| 2004/0007235 A1 | 1/2004 | Rafoss |
| 2004/0049852 A1 | 3/2004 | Phillips et al. |
| 2004/0170948 A1 | 9/2004 | Farenholtz et al. |
| 2004/0214150 A1 | 10/2004 | Eggert et al. |
| 2005/0084833 A1 | 4/2005 | Lacey et al. |
| 2005/0214723 A1 | 9/2005 | Feygin et al. |
| 2005/0214726 A1 | 9/2005 | Feygin et al. |
| 2006/0011203 A1 | 1/2006 | Myklebust |
| 2006/0015044 A1 | 1/2006 | Stavland et al. |
| 2006/0019229 A1 | 1/2006 | Morallee et al. |
| 2006/0026035 A1 | 2/2006 | Younkes et al. |
| 2006/0217624 A1 | 9/2006 | Myklebust et al. |
| 2007/0087314 A1 | 4/2007 | Gomo |
| 2007/0089747 A1 | 4/2007 | Liland et al. |
| 2007/0105082 A1 | 5/2007 | Laerdal et al. |
| 2007/0122785 A1 | 5/2007 | Eggert et al. |
| 2007/0140507 A1 | 6/2007 | Hodne |
| 2007/0264621 A1 | 11/2007 | Nysaether et al. |
| 2007/0270724 A1 | 11/2007 | Havardsholm et al. |
| 2008/0076100 A1 | 3/2008 | Hendrickson et al. |
| 2008/0097534 A1 | 4/2008 | Myklebust et al. |
| 2008/0119766 A1 | 5/2008 | Havardsholm et al. |
| 2008/0131855 A1 | 6/2008 | Eggert et al. |
| 2008/0138778 A1 | 6/2008 | Eggert et al. |
| 2008/0138779 A1 | 6/2008 | Eggert et al. |
| 2008/0138780 A1 | 6/2008 | Eggert et al. |
| 2008/0146973 A1 | 6/2008 | Lund et al. |
| 2008/0146974 A1 | 6/2008 | Lund et al. |
| 2008/0147585 A1 | 6/2008 | Lacey et al. |
| 2008/0160488 A1 | 7/2008 | Younkes et al. |
| 2008/0208082 A1 | 8/2008 | Nysaether et al. |
| 2008/0215102 A1 | 9/2008 | Myklebust et al. |
| 2008/0275337 A1 | 11/2008 | Fossan et al. |
| 2008/0293028 A1 | 11/2008 | Mestad et al. |
| 2008/0294252 A1 | 11/2008 | Myklebust |
| 2008/0312565 A1 | 12/2008 | Celik-Butler et al. |
| 2008/0314386 A1 | 12/2008 | Myklebust et al. |
| 2009/0014001 A1 | 1/2009 | Myklebust et al. |
| 2009/0111080 A1 | 4/2009 | Chen et al. |
| 2009/0148822 A1 | 6/2009 | Eggert et al. |
| 2009/0149771 A1 | 6/2009 | Myklebust et al. |
| 2009/0215011 A1 | 8/2009 | Christensen et al. |
| 2009/0221894 A1 | 9/2009 | Myklebust et al. |
| 2009/0266364 A1 | 10/2009 | Nysaether et al. |
| 2009/0291421 A1 | 11/2009 | Duprez et al. |
| 2010/0021875 A1 | 1/2010 | Hendrickson et al. |
| 2010/0036266 A1 | 2/2010 | Myklebust et al. |
| 2010/0047753 A1 | 2/2010 | Feygin et al. |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |

(56) References Cited

U.S. PATENT DOCUMENTS

| | | |
|---|---|---|
| 2010/0221689 A1 | 9/2010 | Gomo |
| 2010/0291523 A1 | 11/2010 | Elden |
| 2010/0304347 A1 | 12/2010 | Eggert et al. |
| 2011/0207102 A1 | 8/2011 | Trotta et al. |
| 2011/0207103 A1 | 8/2011 | Trotta et al. |
| 2011/0207104 A1 | 8/2011 | Trotta et al. |
| 2011/0207105 A1 | 8/2011 | Eggert et al. |
| 2011/0257560 A1 | 10/2011 | Nilsen |
| 2011/0311956 A1 | 12/2011 | Eggert et al. |
| 2011/0313322 A1 | 12/2011 | Fossan |
| 2012/0029486 A1 | 2/2012 | Laerdal et al. |
| 2012/0034586 A1 | 2/2012 | Gomo |
| 2012/0034588 A9 | 2/2012 | Mestad et al. |
| 2012/0128218 A1 | 5/2012 | Amyot et al. |
| 2012/0191014 A1 | 7/2012 | Fossan |
| 2012/0202181 A1 | 8/2012 | Quinones et al. |
| 2012/0214144 A1 | 8/2012 | Trotta et al. |
| 2012/0214145 A1 | 8/2012 | Eggert et al. |
| 2012/0220887 A1 | 8/2012 | Fossan |
| 2012/0288837 A1 | 11/2012 | Eikefjord |
| 2012/0329022 A1 | 12/2012 | Hetland et al. |
| 2012/0329023 A1 | 12/2012 | Korneliussen |
| 2013/0052626 A1 | 2/2013 | Hoskins |
| 2015/0325151 A1* | 11/2015 | Tuchschmid ...... A61B 19/5244 434/267 |

* cited by examiner

SIMULATION CART

BACKGROUND OF THE INVENTION

Field of the Invention

The present invention is directed generally to apparatuses and systems for conducting medical training simulations.

Description of the Related Art

Currently, specialized stationary simulation centers are used to conduct medical training simulations. Such centers include a dedicated room in which the simulation is conducted, and a separate dedicated theater in which a recording (e.g., a video) of the simulation may be played back to simulation participants. A facilitator may help guide this review and a discussion related to the simulation. Unfortunately, such centers are dedicated spaces that are expensive to install, maintain, and operate.

Because simulation centers provide an artificial atmosphere outside locations in which patients actually receive care, the participants may not behave as they would at an actual site of patient care. To remedy this problem, simulations may be conducted in an actual patient treatment location (referred to as a site-of-care or "in situ" simulation). However, to conduct an in situ simulation, a simulation technician must temporarily install simulation equipment needed to conduct and record the simulation for later review by the participants. Unfortunately, installing the simulation and recording equipment at an in situ simulation location (e.g., a patient room) for the purposes of conducting a single simulation can take over an hour. For example, it can take a simulation technician about 25-35 minutes to set up the simulation equipment. Setting up the simulation equipment includes connecting cables, powering-up hardware, initiating software execution, and setting out supplies. After these tasks are completed, the simulation technician must spend about an additional 25-30 minutes setting up the recording equipment. Setting up the recording equipment includes setting up one or more tripods, cameras, microphones, etc. Further, collecting and transporting the simulation equipment and/or recording equipment may require multiple trips between a storage location and the simulation location. After the simulation has been completed, teardown time also needs to be considered.

Unfortunately, because of the time required to setup and teardown the simulation and recording equipment, in situ simulations are often canceled or rescheduled because the simulation location may be needed for patient care. More and more, health care providers (e.g., hospitals) are finding time spent conducting in-situ simulations is limited by patient demands that compete for space.

Therefore, a need exists for methods, apparatuses, and systems that reduce the amount of time required to setup a site-of-care location for a simulation and/or the amount of time required to tear down the site-of-care location after the simulation has been completed. Methods, apparatuses, and systems that allow a recording of the simulation to be reviewed immediately after the simulation is conducted are particularly desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
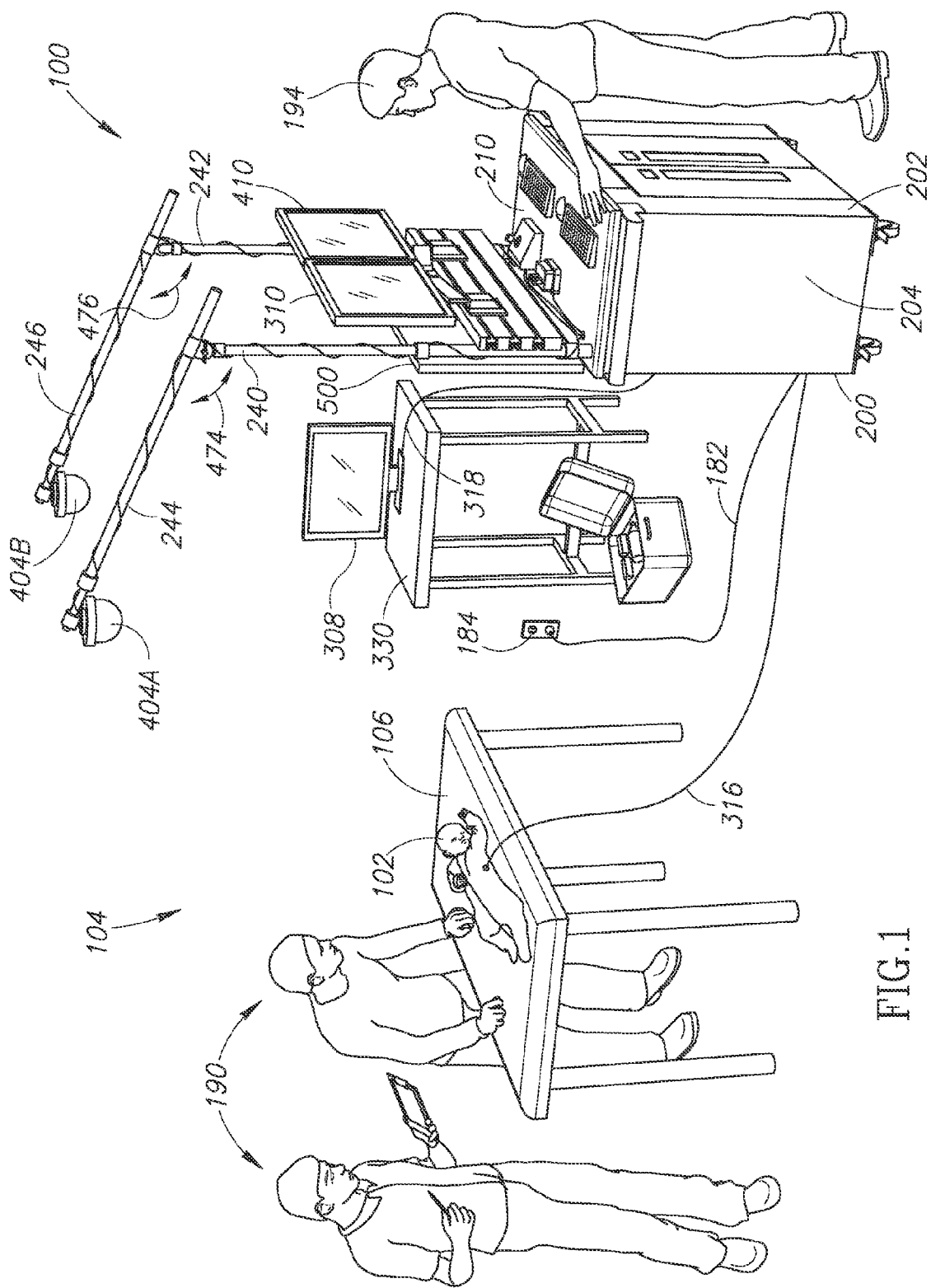
FIG. 1 is a perspective view of a simulation session being conducted and recorded using a simulation cart.

FIG. 1 depicts a simulation cart 100 configured to be used to conduct a medical training simulation session in which a simulation manikin 102 is positioned in a simulation location 104 that is an actual patient treatment location (referred to as site-of-care or "in situ"). By way of a non-limiting example, the simulation location 104 may be a patient room at a hospital, a hospital corridor, an operating room, an outdoor location, a room in a fixed simulation center, and the like. The simulation location 104 includes a patient surface 106 (e.g., a tabletop, a bed, a floor, etc.) upon which the simulation manikin 102 is positioned during the simulation session.

The simulation manikin 102 is configured to simulate at least one selected medical condition. As is apparent to those of ordinary skill in the art, the simulation manikin 102 may be configured to simulate a plurality of medical conditions. In the embodiment illustrated, the simulation manikin 102 is a pediatric or child size simulation manikin. However, other types of manikins, such as adult manikins, veterinary (or animal) manikins, and the like may be used with the simulation cart 100. Further, manikins that simulate less than a patient's entire body may be used. As is apparent to those of ordinary skill in the art, the simulation manikin 102 may be a high fidelity, medium fidelity, or low fidelity simulation manikin.

Figure 3:
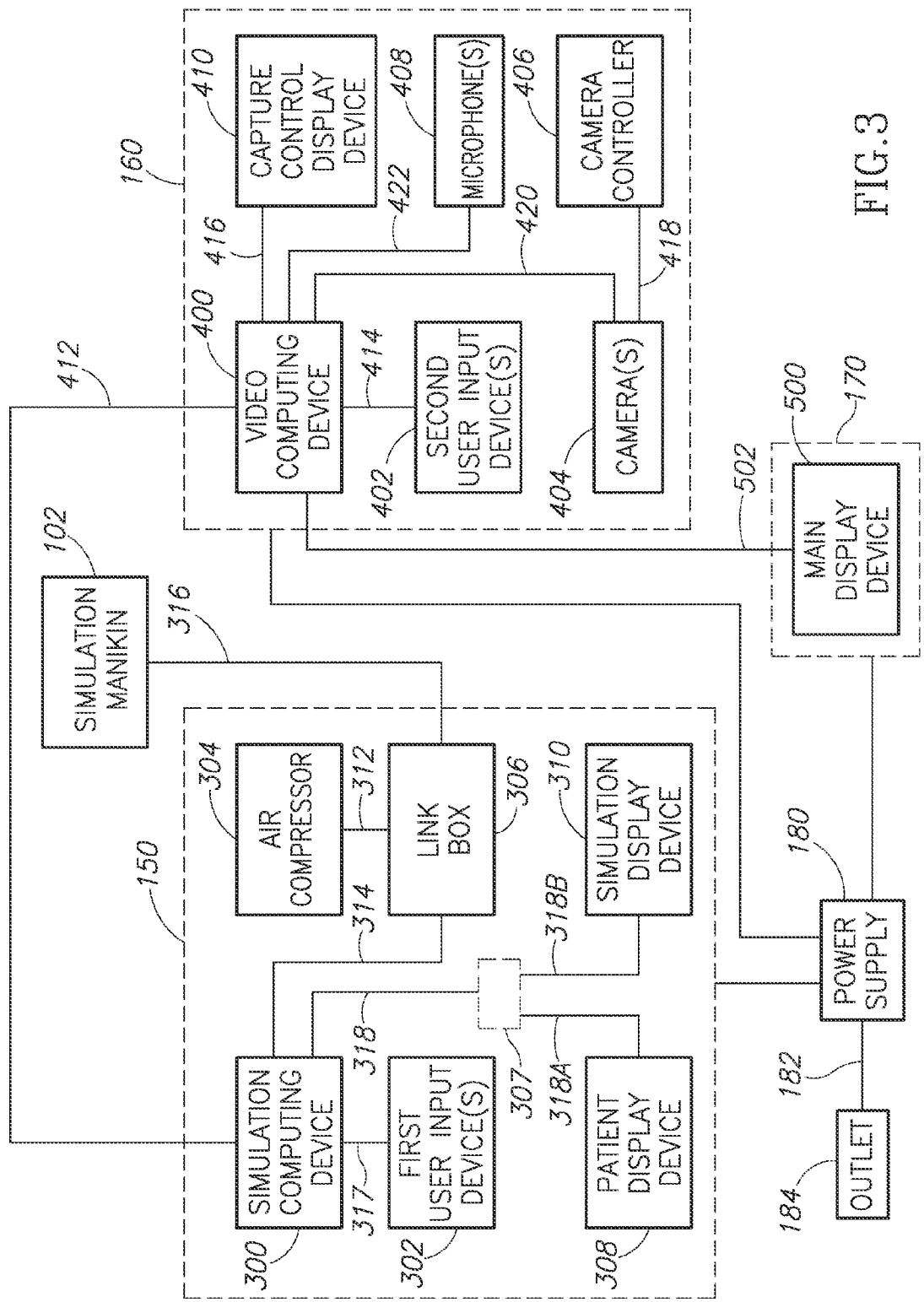
FIG. 3 is a block diagram of simulation, recording, and playback equipment transported by the simulation cart of FIG. 1.

FIG. 3 is block diagram depicting some of the equipment that may be transported by the cart 100 (see FIG. 1). The cart 100 is configured to store and transport simulation equipment 150, recording equipment 160, and playback equipment 170. The cart 100 includes at least one power supply 180 (e.g., a power strip) configured to supply power to the simulation equipment 150, the recording equipment 160, the playback equipment 170, and the simulation manikin 102. A single power cable 182 may be connected to the power supply 180. The power cable 182 is configured to be coupled to a conventional power outlet 184 in (or near) the simulation location 104 (see FIG. 1).

The simulation equipment 150 is operable to send instructions to the simulation manikin 102 to simulate one or more medical conditions. The recording equipment 160 is operable to record the simulation session to create a simulation session recording. The playback equipment 170 is operable to playback the simulation session recording to participants 190 (see FIG. 1) in the simulation, a facilitator 192 (see FIG. 5), and/or a simulation technician 194 (see FIG. 1).

Referring to FIG. 1, the simulation participants 190 are people interacting with and responding to the one or more medical conditions simulated by the simulation manikin 102. By way of non-limiting examples, the simulation participants 190 may include doctors, nurses, paramedics, other medical staff, patient family members, non-clinical personnel, and the like.

Figure 5:
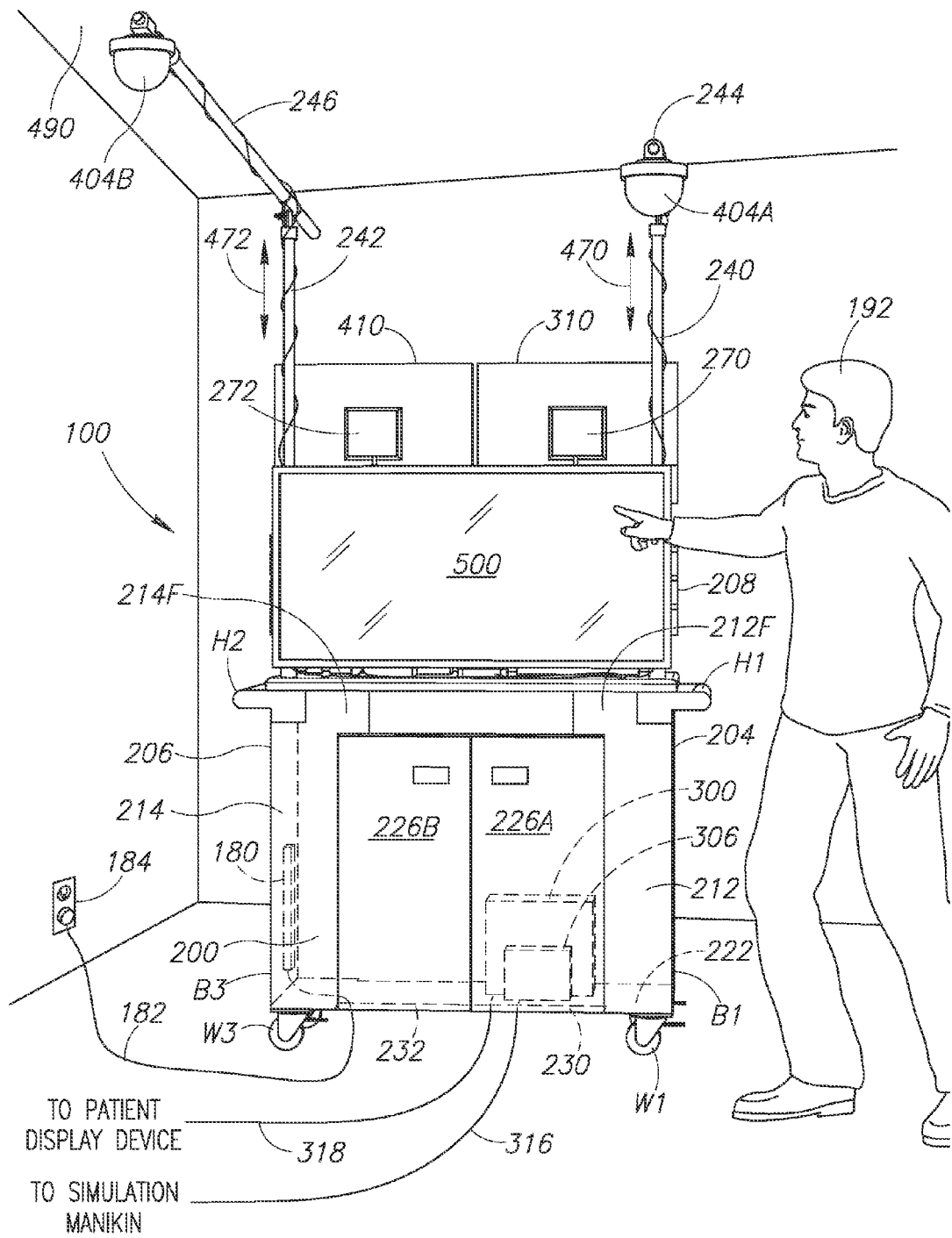
FIG. 5 is a front view of the simulation cart of FIG. 1 depicted alongside a facilitator.

Referring to FIG. 5, the facilitator 192 is a professional who helps the simulation participants 190 (see FIG. 1) review the simulation session recording, and learn from the simulation experience.

Referring to FIG. 3, the simulation technician 194 (see FIG. 1) sets up, operates, and tears down the simulation equipment 150, the recording equipment 160, and the playback equipment 170.

As is apparent to those of ordinary skill in the art, if the simulation manikin 102 is a low fidelity simulation manikin, the simulation manikin 102 may not be configured to receive instructions from the simulation equipment 150. In such embodiments, the simulation equipment 150 may not be used during the simulation session. However, the recording equipment 160 and the playback equipment 170 may be used to create and playback the simulation session recording.

Figure 2:
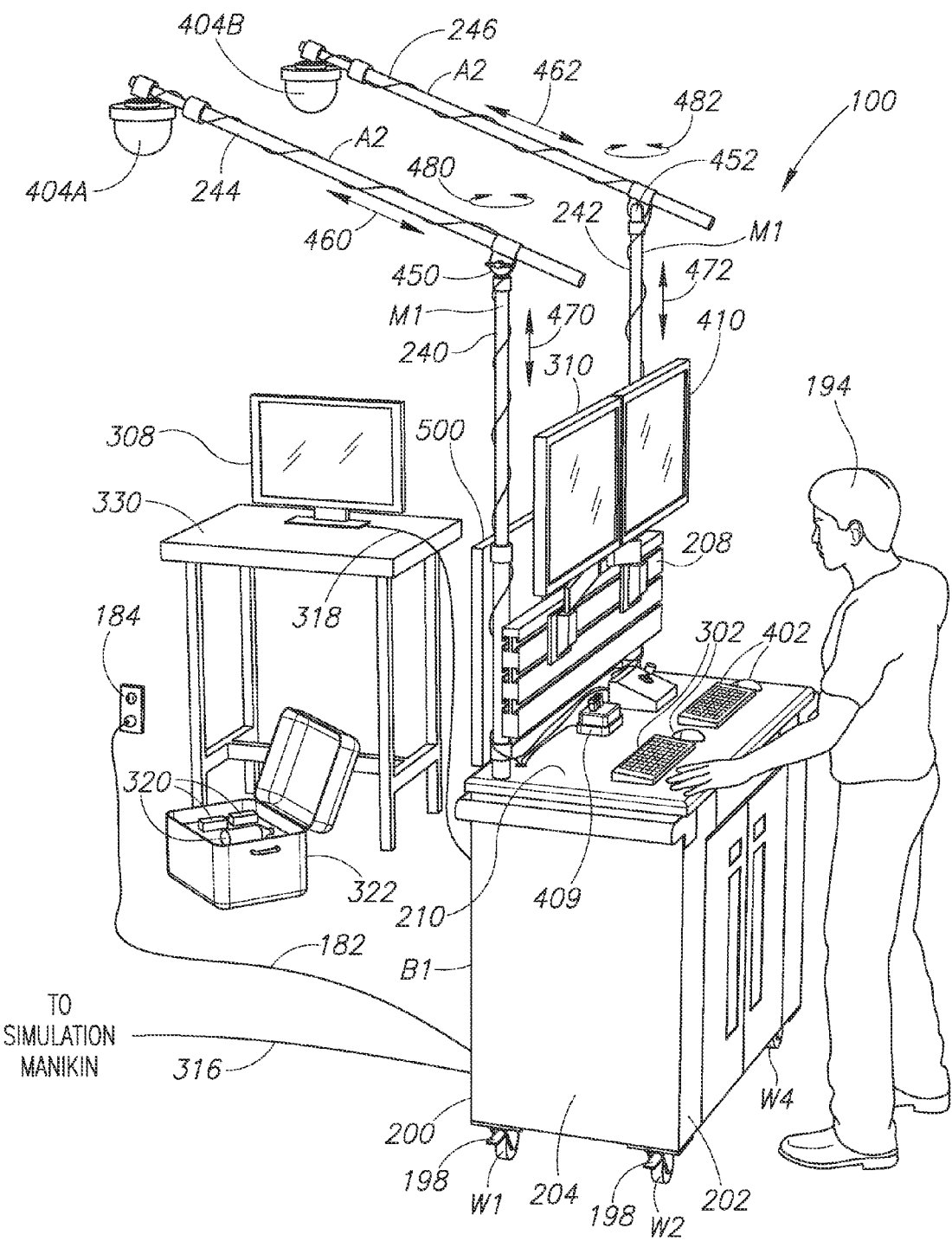
FIG. 2 is an enlarged perspective view of the simulation cart of FIG. 1.
Figure 10:
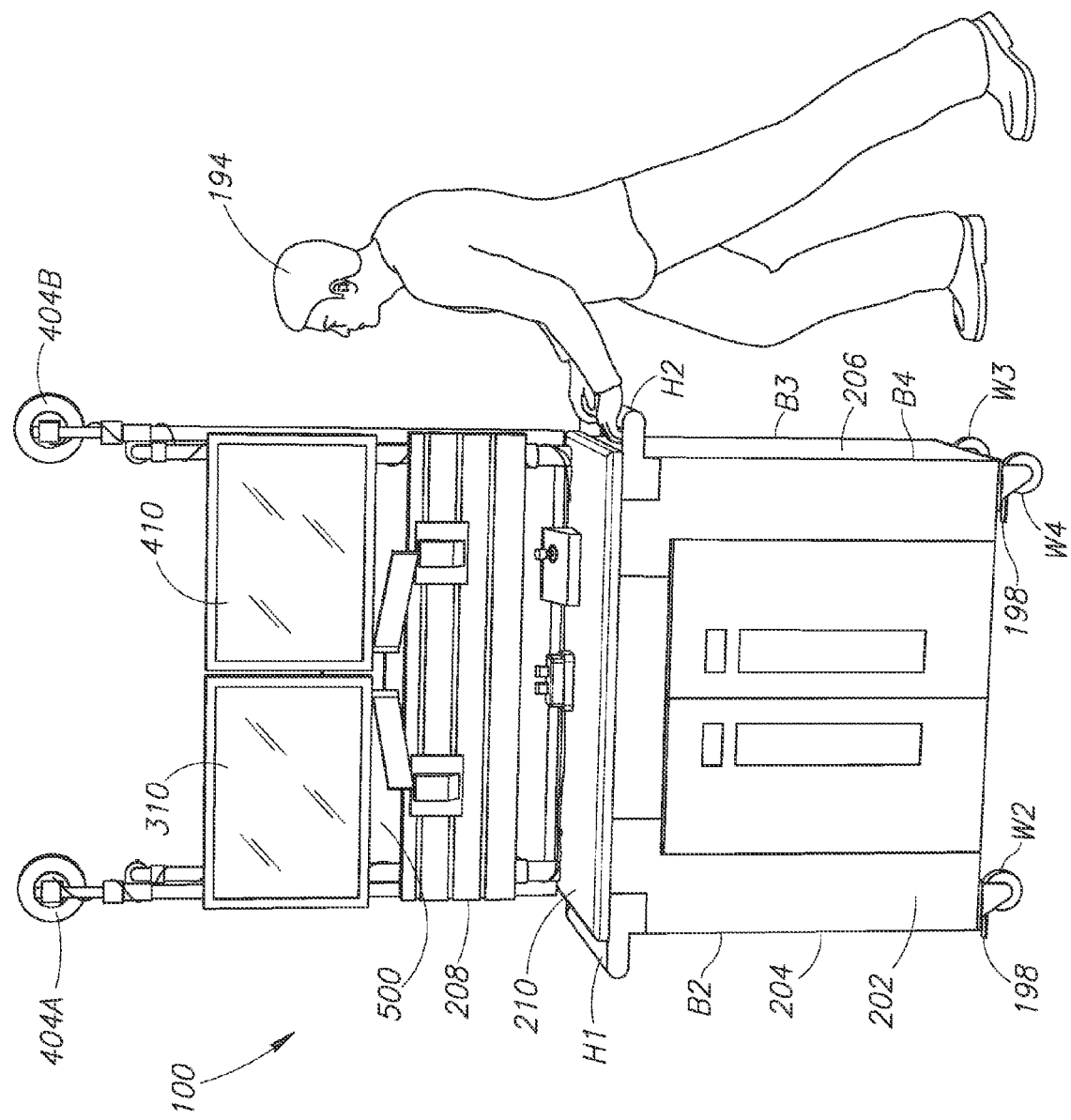
FIG. 10 is a rear view of the simulation cart of FIG. 1 configured to be moved by a simulation technician to another location.

Referring to FIG. 2, the cart 100 is supported by a plurality of wheels W1, W2, W3 (see FIG. 4), and W4. As shown in FIG. 10, the cart 100 may be pushed (or pulled) on the wheels W1-W4 by the simulation technician 194 throughout a medical care facility, such as a hospital, nursing home, simulation training center, and the like. Thus, the cart 100 may be pushed (or pulled) to the simulation location 104 (see FIG. 1) for use therein. In this manner, the simulation location 104 may include any location reachable by the cart 100. The cart 100 is configured to navigate conventional hallways and pass through conventional doorways. Thus, the cart 100 may be used to conduct simulation sessions anywhere inside as well as outside a medical care facility. Each of the wheels W1-W4 includes a releasable wheel lock 198 configured to prevent the wheel from rotating when in the locked position. The wheels W1-W4 may be implemented using multi-directional casters for easily maneuvering throughout hospital areas.

Figure 4:
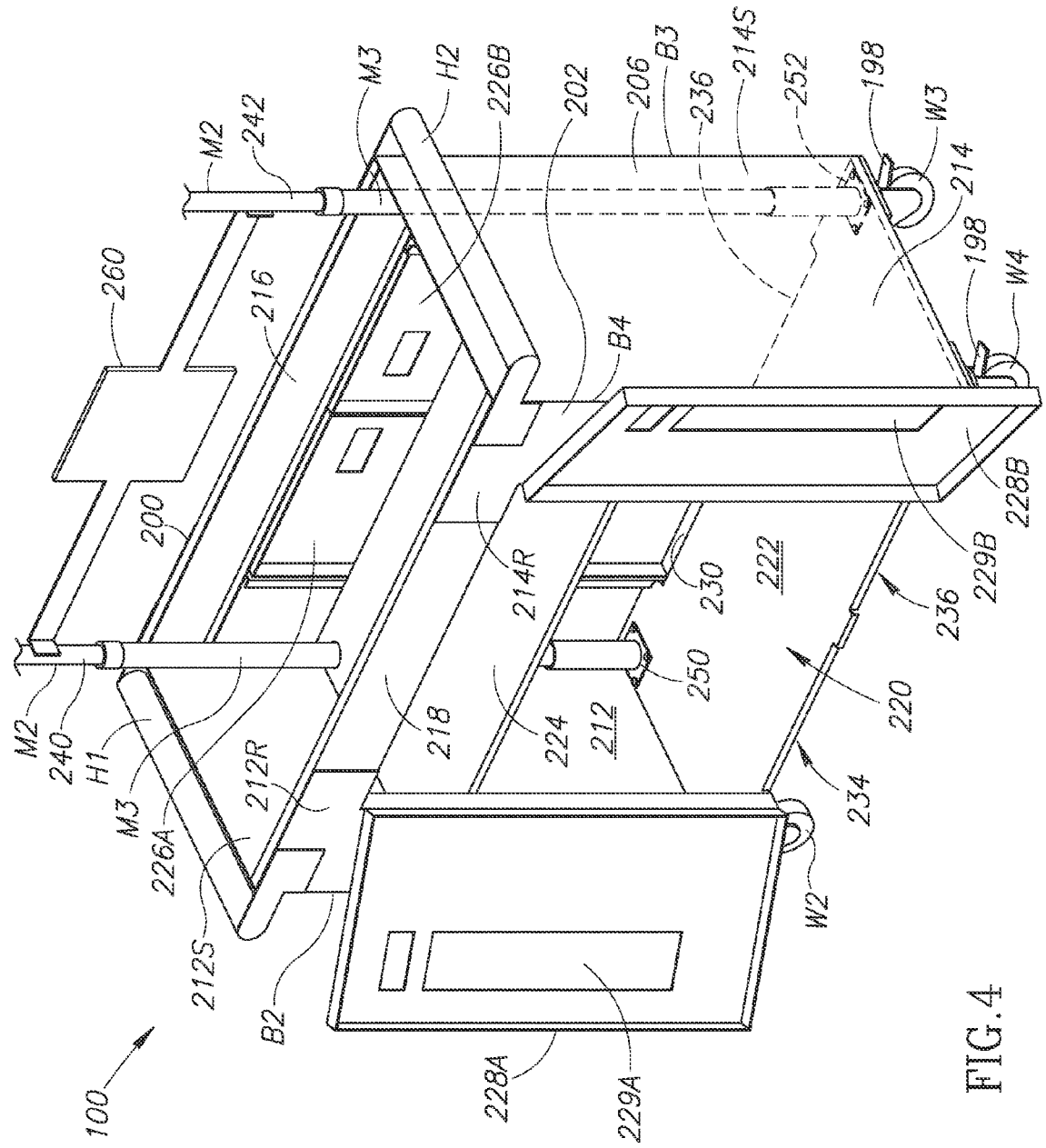
FIG. 4 is an enlarged partial perspective view of the simulation cart of FIG. 1 depicted with its rear doors open and omitting its work surface, and monitor track system.

Referring to FIGS. 4, 5, and 10, optionally, the cart 100 may include one or more handles H1 and H2. As illustrated in FIG. 10, the cart 100 may be pushed (or pulled) by one or more of the handles H1 and H2.

Returning to FIG. 1, the cart 100 has a front portion 200 opposite a rear portion 202, and a first side portion 204 opposite a second side portion 206 (see FIG. 4). In the embodiment illustrated, the first side portion 204 is on the left side of the simulation technician 194, and the second side portion 206 (see FIG. 4) is on the right side of the simulation technician 194, when the simulation technician 194 stands alongside the rear portion 202 of the cart 100 and faces the cart. During a simulation session, the front portion 200 faces the participants 190 in the simulation session, and the simulation manikin 102.

The simulation technician 194 stands alongside the rear portion 202 of the cart 100 during the simulation session. The simulation technician 194 controls the simulation equipment 150 (see FIG. 3) and directs the simulation equipment to cause the simulation manikin 102 to simulate one or more selected medical conditions. For example, the simulation technician 194 may specify parameter values (e.g., heart rate, blood pressure, body temperature, blood oxygen levels, etc.) exhibited by the simulation manikin 102 during the simulation session. The simulation equipment 150 may also be configured to record information entered by the simulation technician 194. For example, the simulation equipment 150 may be configured to receive input (e.g., instructions) from the simulation technician 194 identifying a condition to be simulated, and record the instructions and when such instructions were received.

The cart 100 has a substantially horizontal upwardly facing work surface 210. The work surface 210 may be positioned at standard countertop height and configured to provide the simulation technician 194 and/or the facilitator 192 (see FIG. 5) with a workstation that is isolated from the participants 190 and avoids distracting the participants during the simulation session.

Figure 9:
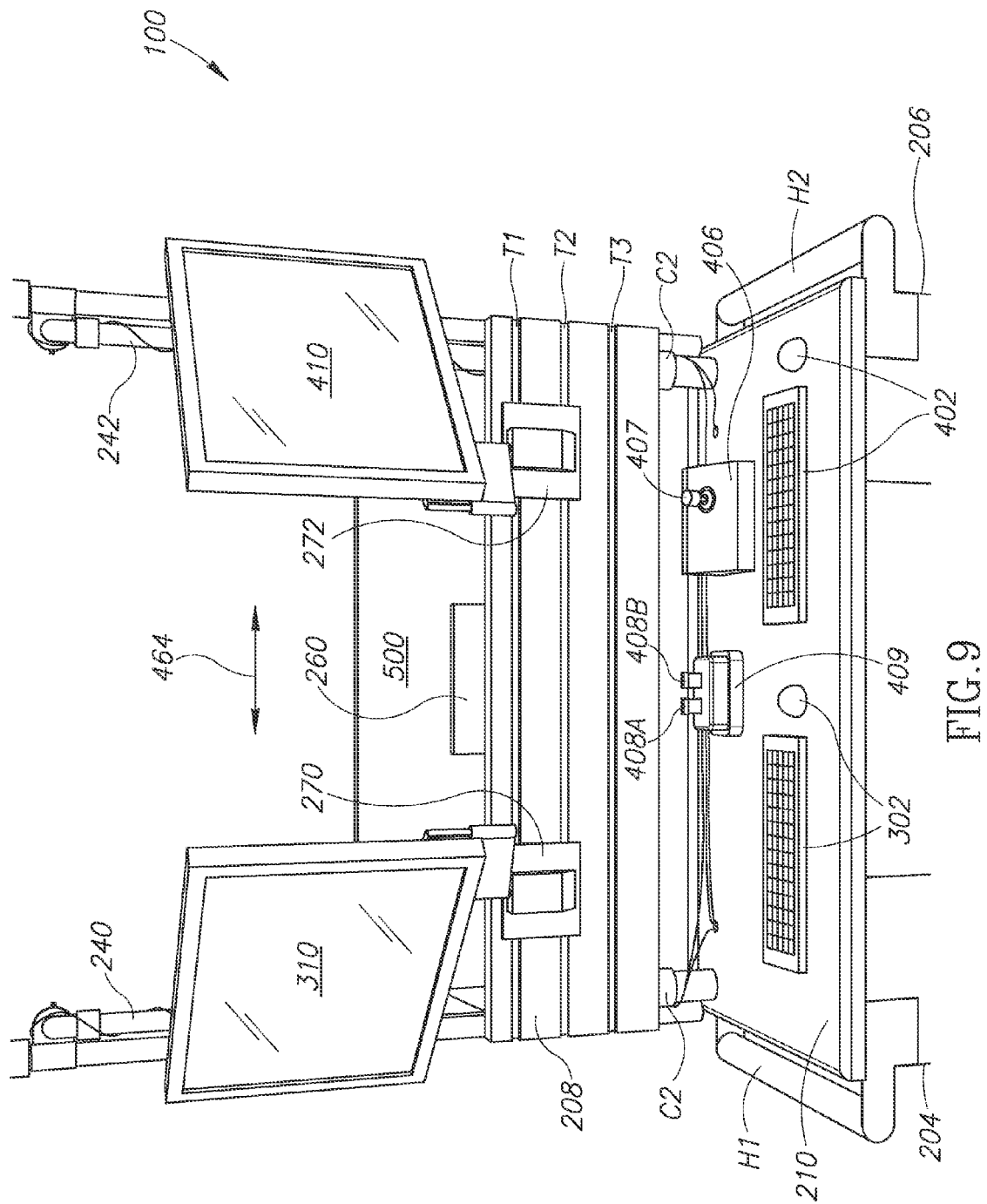
FIG. 9 is an enlarged rear perspective view of the simulation cart of FIG. 1.

Referring to FIG. 9, the cart 100 includes a monitor track system 208 that includes a plurality of separate tracks (or channels) T1-T3. In the embodiment illustrated, the tracks T1-T3 are spaced apart vertically from one another and each extends horizontally between the first and second side portions 204 and 206 of the cart 100.

FIG. 4 is a perspective view of the cart 100 with the work surface 210 (see FIGS. 1 and 2) and the monitor track system 208 (see FIG. 9) removed. Turning to FIG. 4, the cart 100 has an internal storage space 220 defined between the work surface 210 (see FIG. 2), a lower panel 222, a first side panel 212, a second side panel 214, a front intermediate panel 216, and a rear intermediate panel 218. In the embodiment illustrated, the first side panel 212 is positioned along the first side portion 204 of the cart 100. The first side panel 212 includes a first bent portion B1 (see FIG. 5) that positions a front portion 212F (see FIG. 5) of the first side panel 212 to extend along the front portion 200 of the cart. The first side panel 212 includes a second bent portion B2 that positions a rear portion 212R of the first side panel 212 to extend along the rear portion 202 of the cart. A side portion 212S of the first side panel 212 extends between the bent portions B1 and B2 along the first side 204 of the cart 100.

In the embodiment illustrated, the second side panel 214 is positioned along the second side portion 206 of the cart 100. The second side panel 214 includes a third bent portion B3 that positions a front portion 214F (see FIG. 5) of the second side panel 214 to extend along the front portion 200 of the cart. The second side panel 214 includes a fourth bent portion B4 that positions a rear portion 214R of the second side panel 214 to extend along the rear portion 202 of the cart. A side portion 214S of the second side panel 214 extends between the bent portions B3 and B4 along the second side 206 of the cart 100.

The front intermediate panel 216 connects the front portion 212F (see FIG. 5) of the first side panel 212 with the front portion 214F (see FIG. 5) of the second side panel 214. In the embodiment illustrated, the front intermediate panel 216 extends from the bent portion B1 (see FIG. 5) to the bent portion B3. The rear intermediate panel 218 connects the rear portion 212R of the first side panel 212 with the rear portion 214R of the second side panel 214. In the embodiment illustrated, the rear intermediate panel 218 extends from the bent portion B2 to the bent portion B4.

In the embodiment illustrated, the internal storage space 220 is bifurcated by a substantially horizontal shelf 224. The internal storage space 220 may be accessed via a pair of front doors 226A and 226B, and/or a pair of rear doors 228A and 228B. Turning to FIG. 5, the front door 226A is attached by hinges (not shown) to the front portion 212F of the first side panel 212. The front door 226B is attached by hinges (not shown) to the front portion 214F of the second side panel 214. Returning to FIG. 4, the rear door 228A is attached by hinges (not shown) to the rear portion 212R of the first side panel 212. The rear door 228B is attached by hinges (not shown) to the rear portion 214R of the second side panel 214. In the embodiment illustrated, the front intermediate panel 216 is positioned between the work surface 210 (see FIGS. 1 and 2) and the front doors 226A and 226B, and the rear intermediate panel 218 is positioned between the work surface 210 and the rear doors 228A and 228B. Optionally, the rear doors 228A and 228B include windows 229A and 229B, respectively. The internal storage space 220 may be viewed from outside the cart 100 through the windows 229A and 229B.

Each of the lower panel 222, the first side panel 212, the second side panel 214, the front intermediate panel 216, the rear intermediate panel 218, the shelf 224, the front doors 226A and 226B, and the rear doors 228A and 228B may be constructed from sheet metal. However, this is not a requirement. Optionally, the lower panel 222 may be supported on a lower support frame (not shown). The wheels W1-W4 may be coupled to the lower support frame (not shown). Referring to FIG. 5, the power supply 180 may be coupled to one or more of the panels 212, 214, 216, 218, and 222. In the embodiment illustrated, the power supply 180 is coupled to the second side panel 214. Together, the panels 212, 214, 216, 218, and 222, the work surface 210, and the optional lower support frame (not shown), if present, may be characterized as being a cart body.

At least one front gap is positioned between the front doors 226A and 226B and the lower panel 222. In the embodiment illustrated in FIG. 5, front gaps 230 and 232 are positioned between the front doors 226A and 226B, respectively, and the lower panel 222. One or more cables (e.g., the power cable 182, a cable 316, and a communication link 318) may extend from inside the internal storage space 220 (see FIG. 4) through the front gaps 230 and 232 when the front doors 226A and 226B are closed. In the embodiment illustrated, the front gaps 230 and 232 have been implemented as cutouts formed in the lower panel 222.

Referring to FIG. 4, optionally, at least one rear gap may be positioned between the rear doors 228A and 228B and the lower panel 222. In the embodiment illustrated, rear gaps 234 and 236 are positioned between the rear doors 228A and 228B and the lower panel 222. One or more cables may extend from inside the internal storage space 220 through the rear gaps 234 and 236 when the rear doors 228A and 228B are closed. In the embodiment illustrated, the rear gaps 234 and 236 have been implemented as cutouts formed in the lower panel 222.

Turning to FIG. 2, a first upright support assembly 240 is positioned in the front portion 200 of the cart 100. The first upright support assembly 240 may be positioned on the first side portion 204 of the cart 100. Thus, as is the embodiment illustrated, the first upright support assembly 240 may be positioned in the left front corner of the cart 100 relative to the simulation technician 194 (near the first bent portion B1 of the first side panel 212).

A second upright support assembly 242 spaced apart from the first upright support assembly 240 is also positioned in the front portion 200 of the cart 100. The second upright support assembly 242 may be positioned on the second side portion 206 (see FIG. 4) of the cart 100. Thus, as is the embodiment illustrated, the second upright support assembly 242 may be positioned in the right front corner of the cart 100 relative to the simulation technician 194 (near the third bent portion B3 (see FIG. 4) of the second side panel 214).

Figure 8:
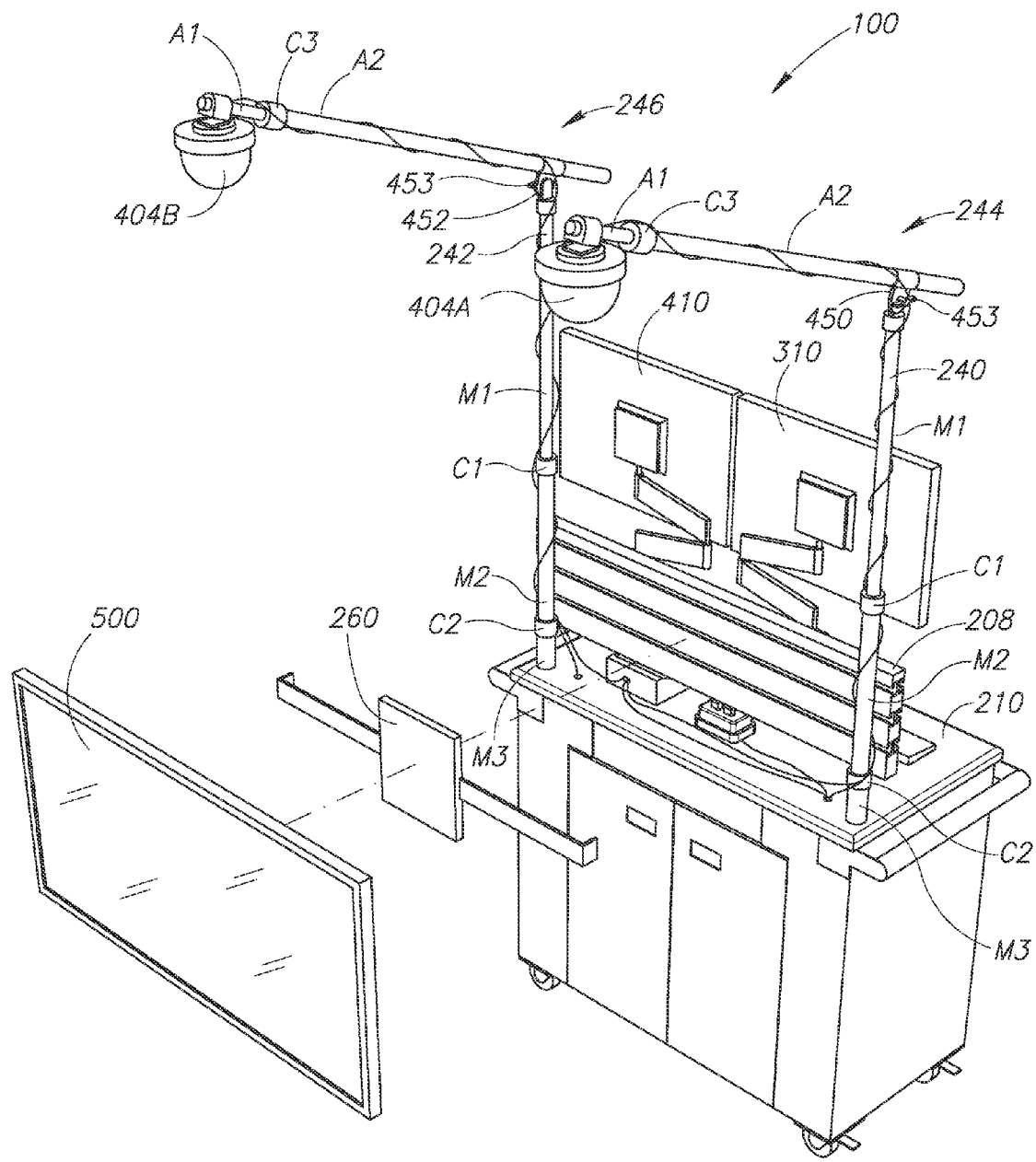
FIG. 8 is a partially exploded front perspective view of the simulation cart of FIG. 1.

Referring to FIG. 8, the first and second upright support assemblies 240 and 242 may be substantially identical to one another. In the embodiment illustrated, the first and second upright support assemblies 240 and 242 each includes members M1-M3, and connectors C1 and C2. The first member M1 is slidably partially received inside the second member M2, and the second member M2 is slidably partially received inside the third member M3. The first, second and third members M1, M2, and M3 may be characterized as telescoping. As is apparent to those of ordinary skill in the art, depending upon the implementation details, the first member M1 may extend partially into the third member M3. In the first upright support assembly 240, the first member M1 slides longitudinally inside the second member M2, and the second member M2 slides longitudinally inside the third member M3 in a direction indicated by double-headed arrow 470 (see FIG. 2). In the second upright support assembly 242, the first member M1 slides longitudinally inside the second member M2, and the second member M2 slides longitudinally inside the third member M3 in a direction indicated by double-headed arrow 472 (see FIG. 2). Each of the members M1-M3 may be implemented as hollow metal and/or plastic tubes or pipes, solid (or partially solid) metal and/or plastic bars, and the like.

The first connector C1 is configured to limit the movement of the first member M1 relative to the second member M2. The first connector C1 may be configured to releasably lock the longitudinal position of the first member M1 with respect to the second member M2. The first connectors C1 may be unlocked so that the first members M1 may be slid to desired positions with respect to the second members M2. Then, the first connectors C1 may be locked to maintain the first members M1 in the desired positions with respect to the second members M2.

The second connector C2 is configured to limit the movement of the second member M2 relative to the third member M3. The second connector C2 may be configured to releasably lock the longitudinal position of the second member M2 with respect to the third member M3. The second connectors C2 may be unlocked so that the second members M2 may be slid to desired positions with respect to the third members M3. Then, the second connectors C2 may be locked to maintain the second members M2 in the desired positions with respect to the third members M3.

The connectors C1 and C2 may be used to determine how far the first and second upright support assemblies 240 and 242 extend upwardly. By way of a non-limiting example, when fully extended, the first and second upright support assemblies 240 and 242 may each be about eight feet tall.

Referring to FIG. 4, the third members M3 of the first and second upright support assemblies 240 and 242 extend through the work surface 210 (see FIG. 1), through the internal storage space 220, and are mounted to the lower panel 222 inside the internal storage space 220 by bases 250 and 252, respectively. The first and second upright support assemblies 240 and 242 may be characterized as being boom stands.

Returning to FIG. 2, connectors 450 and 452 are mounted on upper distal ends of the first members M1 of the first and second upright support assemblies 240 and 242, respectively. First and second boom arm (or jib) assemblies 244 and 246 are mounted to the first members M1 of the first and second upright support assemblies 240 and 242, respectively, by the connectors 450 and 452, respectively. The first and second boom arm assemblies 244 and 246 may be substantially identical to one another. Referring to FIG. 8, in the embodiment illustrated, the first and second boom arm assemblies 244 and 246 each includes a first member A1 slidably partially received inside a second member A2. The first and second members A1 and A2 may be characterized as telescoping. In the first boom arm assembly 244, the first member A1 slides longitudinally inside the second member A2 in a direction indicated by double-headed arrow 460 (see FIG. 2). In the second boom arm assembly 246, the first member A1 slides longitudinally inside the second member A2 in a direction indicated by double-headed arrow 462 (see FIG. 2). Each of the first and second members A1 and A2 may be implemented as hollow metal and/or plastic tubes or pipes, solid (or partially solid) metal and/or plastic bars, and the like.

The first and second boom arm assemblies 244 and 246 each includes a connector C3 configured to limit the movement of the first member A1 relative to the second member A2. The connector C3 may be configured to releasably lock the longitudinal position of the first member A1 with respect to the second member A2. Thus, the connectors C3 may be used to determine how far the first and second boom arm assemblies 244 and 246 extend outwardly from the first and second upright support assemblies 240 and 242, respectively. The connectors C3 may be unlocked so that the first members A1 may be slid to desired positions with respect to the second members A2. Then, the connectors C3 may be locked to maintain the first members A1 in the desired positions with respect to the second members A2. By way of a non-limiting example, when fully extended, the first and second boom arm assemblies 244 and 246 may each be about seven feet long.

The second members A2 of the first and second boom arm assemblies 244 and 246 are mounted to the first members M1 of the first and second upright support assemblies 240 and 242, respectively, by the connectors 450 and 452, respectively. The connectors 450 and 452 each includes a pivot. The pivot of the connector 450 allows the first boom arm assembly 244 to rotate relative to the first upright support assembly 240 in directions indicated by double-headed arrow 474 (see FIG. 1). The pivot of the connector 452 allows the second boom arm assembly 246 to rotate relative to the second upright support assembly 242 in directions indicated by double-headed arrow 476 (see FIG. 1). The connectors 450 and 452 each includes a releasable lock 453 (see FIG. 8) that may be used to lock the angles of the first and second boom arm assemblies 244 and 246, respectively, relative to the first and second upright support assemblies 240 and 242, respectively. The releasable locks 453 may be unlocked and the first and second boom arm assemblies 244 and 246 pivoted (using the pivots of the connectors 450 and 452, respectively) relative to the first and second upright support assemblies 240 and 242, respectively, to a desired position. Then, the releasable locks 453 may be locked to maintain the connectors 450 and 452 in the desired position.

Turning to FIG. 2, the second members A2 of the first and second boom arm assemblies 244 and 246 may be configured to slide longitudinally with respect to the connectors 450 and 452, respectively, in directions indicated by double-headed arrows 460 and 462, respectively. The releasable locks 453 (see FIG. 8) may be used to lock the longitudinal position of the second members A2 of the first and second boom arm assemblies 244 and 246 with respect to the connectors 450 and 452, respectively. Thus, the releasable locks 453 may be used to determine how far the second members A2 of the first and second boom arm assemblies 244 and 246 extend outwardly from the connectors 450 and 452, respectively.

The connectors 450 and 452 are selectively rotatable about the first members M1 of the first and second upright support assemblies 240 and 242, respectively, in directions indicated by double-headed arrows 480 and 482, respectively. The connectors 450 and 452 may be rotated about the first members M1 of the first and second upright support assemblies 240 and 242, respectively, to a desired position.

Referring to FIG. 8, the connectors C1-C3, and the releasable locks 453 of the connectors 450 and 452 may be selectively and individually unlocked so that the simulation technician 194 may adjust the first and second boom arm assemblies 244 and 246 and the first and second upright support assemblies 240 and 242 to position cameras 404A and 404B in desired positions to capture video of the simulation session. Then, the connectors C1-C3, and the releasable locks 453 of the connectors 450 and 452 may be selectively and individually locked before the simulation session begins. After the simulation session has ended, the connectors C1-C3, and the releasable locks 453 of the connectors 450 and 452 may be selectively and individually unlocked so that the simulation technician 194 may retract the first and second boom arm assemblies 244 and 246, and the first and second upright support assemblies 240 and 242 into positions (e.g., as depicted in FIG. 10) suitable for moving the cart 100 to another location (e.g., a storage location).

Together, the first upright support assembly 240, the connector 450, and the first boom arm assembly 244 may be characterized as forming a first camera boom assembly. Similarly, the second upright support assembly 242, the connector 452, and the second boom arm assembly 246 may be characterized as forming a second camera boom assembly.

Referring to FIGS. 4 and 8, a mounting bracket 260 extends between the second members M2 of the first and second upright support assemblies 240 and 242. Referring to FIG. 4, a forward facing main display device 500 is mounted to the bracket 260.

Referring to FIG. 9, a first articulating monitor mount 270 is mounted on one or more of the tracks T1-T3 of the monitor track system 208, and a second articulating monitor mount 272 is mounted on one or more of the tracks T1-T3 of the monitor track system 208. In FIG. 9, the articulating monitor mounts 270 and 272 are both illustrated as being mounted on the tracks T1 and T2. A simulation display device 310 is mounted to the monitor track system 208 by the first articulating monitor mount 270. A capture control display device 410 is mounted to the monitor track system 208 by the second articulating monitor mount 272. The first and second articulating monitor mounts 270 and 272 may include one or more joints (or pivots) that may be used to change the position and/or angle of the display devices 310 and 410, respectively, to be viewed by the simulation technician 194 (see FIGS. 1 and 2).

The first and second articulating monitor mounts 270 and 272 are each configured to slide horizontally along (one or more of the tracks T1-T3 of) the monitor track system 208 in the directions indicated by the double-headed arrow 464. Further, the first and second articulating monitor mounts 270 and 272 may each be configured to releasably lock the horizontal position of the first and second articulating monitor mounts 270 and 272 with respect to the monitor track system 208. The first and second articulating monitor mounts 270 and 272 may be unlocked and the first and second articulating monitor mounts 270 and 272 slid along (left and/or right) one or more of the tracks T1-T3 of the monitor track system 208 to a desired position. Then, the first and second articulating monitor mounts 270 and 272 may be locked to maintain the first and second articulating monitor mounts 270 and 272 in the desired position. Thus, the first and second articulating monitor mounts 270 and 272 may be used to determine the horizontal positions of the display devices 310 and 410, respectively. The vertical positions of the first and second articulating monitor mounts 270 and 272, and the display devices 310 and 410, respectively, may be determined at least in part based on to which of the vertically spaced apart tracks T1-T3 the first and second articulating monitor mounts 270 and 272 have been mounted.

As mentioned above, referring to FIG. 3, the cart 100 is configured to store and transport the simulation equipment 150, the recording equipment 160, and the playback equipment 170. Thus, the cart 100 includes all of the components required to conduct a simulation session, record the simulation session, and playback the simulation session recording. The cart 100 is configured to have a significantly smaller storage footprint than a simulation center. By way of a non-limiting example, the cart 100 may be about 48 inches long, about 24 inches wide, and about 83 inches tall.

Simulation Equipment

Referring to FIG. 3, the simulation equipment 150 includes a simulation computing device 300, one or more first user input devices 302, an air compressor 304, a link box 306, an optional splitter 307, a patient display device 308, and the simulation display device 310. Each of the simulation computing device 300, the air compressor 304, the link box 306, the optional splitter 307, the patient display device 308, and the simulation display device 310 may be connected (e.g., via a power cord) to the power supply 180 and receive power therefrom.

The air compressor 304 is connected to the link box 306 by an air hose or line 312. The simulation computing device 300 is connected to the link box 306 by a communication link 314 (e.g., a Cat 5 cable). The link box 306 is connected to the simulation manikin 102 by the cable 316 that includes both an airline and a communication link. The cable 316 may also include a power transmission line that supplies power to the simulation manikin 102. The simulation computing device 300 is connected to each of the first user input device(s) 302 by a communication link 317. The simulation computing device 300 is connected to each of the patient display device 308, and the simulation display device 310 by the communication link 318 (e.g., a VGA cable). In the embodiment illustrated, the communication link 318 is implemented as a cable, and the communication link 318 connects the simulation computing device 300 to the optional splitter 307. The splitter 307 splits a signal received from the communication link 318, and transmits the signal to the patient display device 308 via a communication link 318A (e.g., a VGA cable), and to the simulation display device 310 via a communication link 318B (e.g., a VGA cable). Each of the communication links 314, 317, 318, 318A, and 318B may be a wired or wireless connection.

The components of the simulation equipment 150 are connected to one another as described above on the cart 100. Further, the components of the simulation equipment 150 are connected to the power supply 180 as described above on the cart 100. Thus, when the cart 100 arrives at the simulation location 104, the simulation equipment 150 is ready to use immediately after the power cable 180 is connected to the power outlet 184, and the cable 316 is connected to the simulation manikin 102.

Referring to FIGS. 1 and 2, optionally, the cart 100 may house the simulation manikin 102 (e.g., on the shelf 224 illustrated in FIG. 6), and/or supplies 320 (e.g., on the lower panel 222 illustrated in FIG. 7) for use by the simulation participants 190 during the simulation session. Thus, the simulation manikin 102, and/or the supplies 320 may be included in the simulation equipment 150 (see FIG. 3). As is apparent to those of ordinary skill in the art, while the supplies present at the site-of-care may be used during a simulation session, the cost of performing the simulation session can be reduced by reusing supplies used in previous simulation sessions. Referring to FIG. 2, the supplies 320 may be stored in a portable container or supply case 322.

Figure 6:
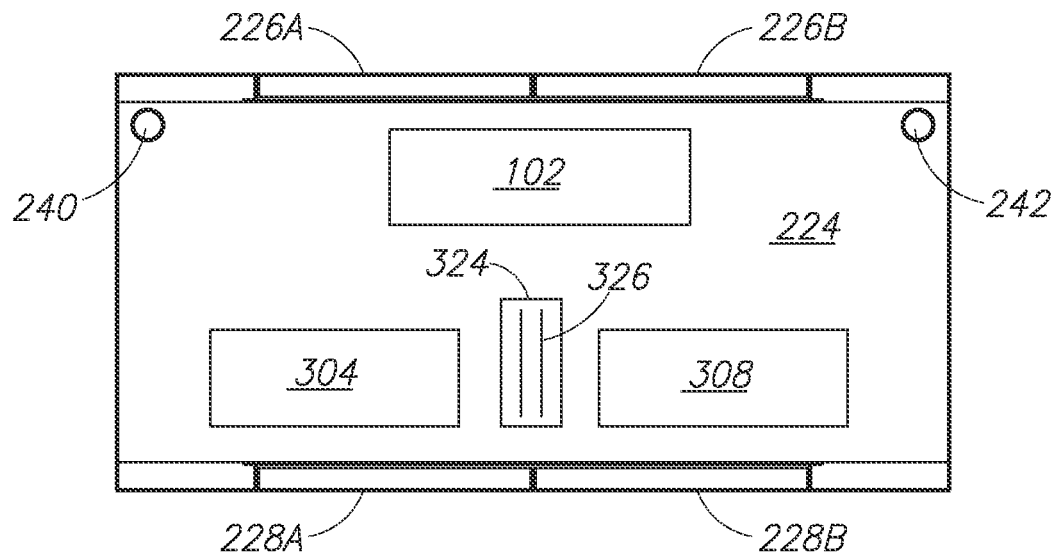
FIG. 6 is an illustration depicting components stored on a shelf of the simulation cart of FIG. 1.

Optionally, referring to FIG. 6, a scenario library/file 324 including one or more simulation scripts 326 to be reviewed by the simulation technician 194 (see FIGS. 1 and 2) may be stored (e.g., on the shelf 224) inside the internal storage space 220 (see FIG. 4) of the cart 100. In such embodiments, the simulation equipment 150 (see FIG. 3) may include the scenario library/file 324. Each script provides information used to conduct a simulation of a particular medical condition.

Turning to FIG. 9, the simulation display device 310 is mounted on the first and second upright support assemblies 240 and 242 (by the monitor track system 208 and the first articulating monitor mount 270) at a location above the work surface 210, and faces the simulation technician 194 (see FIGS. 1 and 2). The first user input device(s) 302 may be positioned on the work surface 210 for use by the simulation technician 194. However, the first user input device(s) 302 may be stored inside the internal storage space 220 (see FIG. 4) while the cart 100 being moved to another location, and/or while the cart is being stored in a storage location.

Referring to FIG. 3, both the simulation computing device 300, and the air compressor 304 are stored inside the internal storage space 220 (see FIG. 4), and remain therein during the simulation session. Inside the internal storage space 220, both the simulation computing device 300, and the air compressor 304 are connected to the power supply 180 and are ready for use. In the embodiment illustrated in FIGS. 6 and 7, the simulation computing device 300 is positioned on the lower panel 222, and the air compressor 304 is positioned on the shelf 224. The simulation technician 194 may view the simulation computing device 300 and/or the air compressor 304 through one of the windows 229A and 229B (see FIG. 4) to see if the simulation computing device 300 and/or the air compressor 304 is powered up.

Referring to FIG. 6, the patient display device 308 is stored in the internal storage space 220 (e.g., on the shelf 224) when not in use. Referring to FIG. 1, during a simulation session, the patient display device 308 is removed from the cart 100 and positioned to be viewable by the participants 190. For example, the patient display device 308 may be positioned on a tabletop 330 (or similar surface) during the simulation session.

Figure 7:
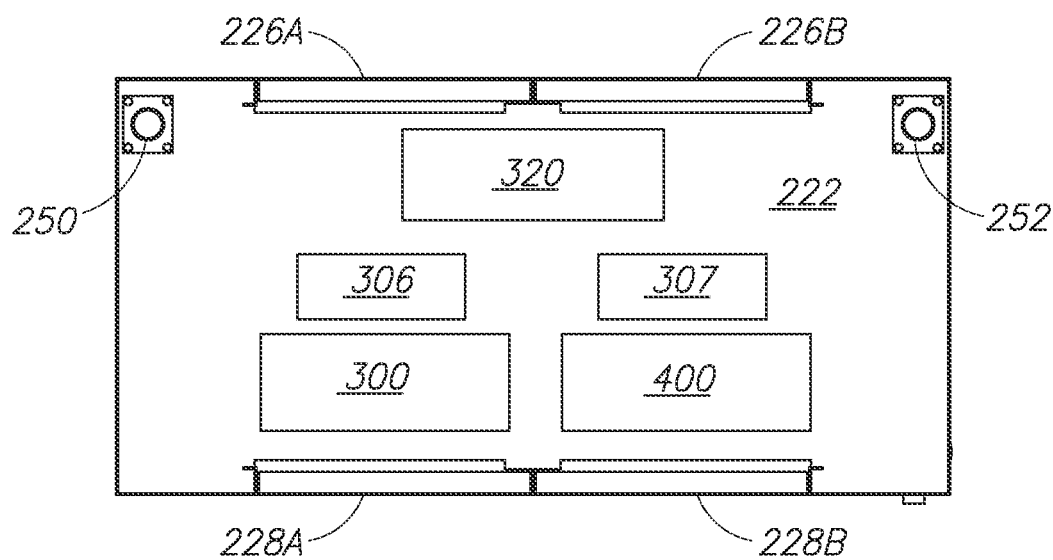
FIG. 7 is an illustration depicting components stored on a lower panel of the simulation cart of FIG. 1.

Referring to FIG. 7, the optional splitter 307 may be stored on the lower panel 222. Further, the link box 306 may be stored on the lower panel 222.

Referring to FIG. 3, the simulation computing device 300 executes simulation software (e.g., Simbaby) that generates a user interface displayed simultaneously by the patient display device 308, and the simulation display device 310. The simulation software also controls the link box 306, which controls the simulation manikin 102.

The simulation software executing on the simulation computing device 300 receives commands from the simulation technician 194 via the first user input device(s) 302 (e.g., a mouse, a keyboard, and the like), and translates those commands into instructions for the link box 306, and the simulation manikin 102. For example, the simulation technician 194 may enter a command to increase the respiration rate of the simulation manikin 102. The simulation computing device 300 translates this command into instructions to the link box 306 to obtain air from the air compressor 304 and supply the air as simulated breathing to the patient at a faster rate. By way of another non-limiting example, the simulation technician 194 may enter a command to decrease the blood oxygen level of the simulation manikin 102. The simulation computing device 300 translates this command into instructions to the simulation manikin 102 to exhibit physical traits consistent with a reduced blood oxygen level (e.g., the simulation computing device 300 may instruct the simulation manikin 102 via the link box 306 to turn its lips blue).

The patient display device 308 is positioned to be viewable by the participants 190 in the simulation session. The patient display device 308 communicates information about the patient (the simulation manikin 102) to the participants 190 during the simulation session.

As mentioned above, the simulation computing device 300 generates a user interface that is displayed by both the patient display device 308, and the simulation display device 310. The user interface is communicated to the display devices 308 and 310 via a display signal. The display signal may be supplied to the splitter 307 (e.g., a VGA splitter), that splits the signal into two separate signals. A first of the two signals is sent to the patient display device 308. A second of the two signals is sent to the simulation display device 310. Optionally, the splitter 307 may split the signal into three separate signals. In such embodiments, the third signal may be sent to the recording equipment 160. Alternatively, the display signal may be sent to the recording equipment 160 via a communication link 412.

Recording Equipment

Referring to FIG. 3, the recording equipment 160 includes a video computing device 400, one or more second user input devices 402, one or more cameras 404, a camera controller 406, one or more microphones 408, and the capture control display device 410. Each of the video computing device 400, the camera(s) 404, the camera controller 406, the microphone(s) 408, and the capture control display device 410 may be connected to the power supply 180 and receive power therefrom.

The video computing device 400 is connected to the second user input device(s) 402, the camera(s) 404, the microphone(s) 408, the capture control display device 410, and the simulation computing device 300. The video computing device 400 is connected to the simulation computing device 300 by the communication link 412 (e.g., a Cat 5 cable). The video computing device 400 is connected to each of the second user input device(s) 402 by a communication link 414. The video computing device 400 is connected to the capture control display device 410 by a communication link 416 (e.g., a HDMI cable). The camera controller 406 is connected to each of the camera(s) 404 by a communication link 418 (e.g., a DE-9 cable). The video computing device 400 is connected to each of the camera(s) 404 by a communication link 420 (e.g., a RCA cable). The video computing device 400 is connected to each of the microphone(s) 408 by a communication link 422 (e.g., a HDMI cable). Each of the communication links 412, 414, 416, 418, 420, and 422 may be a wired or wireless connection.

The components of the recording equipment 160 are connected to one another as described above on the cart 100. The video computing device 400 is connected to the simulation computing device 300 on the cart 100. Further, the components of the recording equipment 160 are connected to the power supply 180 as described above on the cart 100. Thus, when the cart 100 arrives at the simulation location 104 (see FIG. 1), the recording equipment 160 is ready to use immediately after the power cable 180 is connected to the power outlet 184. In the embodiment illustrated in FIG. 7, the video computing device 400 is positioned on the lower panel 222 inside the cart 100. The simulation technician 194 may view the video computing device 400 through one of the windows 229A and 229B (see FIG. 4) to see if the video computing device 400 is powered up.

Referring to FIG. 9, the capture control display device 410 is mounted on the first and second upright support assemblies 240 and 242 (by the monitor track system 208 and the second articulating monitor mount 272) at a location above the work surface 210, and faces toward the simulation technician 194 (see FIGS. 1 and 2). The second user input device(s) 402 may be positioned on the work surface 210 for use by the simulation technician 194. However, the second user input device(s) 402 may be stored inside the internal storage space 220 (see FIG. 4) while the cart 100 being moved to another location, and/or while the cart is being stored in a storage location.

Turning to FIG. 8, in the embodiment illustrated, the cameras 404 (see FIG. 3) include the first camera 404A and the second camera 404B. The first camera 404A is mounted on the first member A1 of the first boom arm assembly 244, and the second camera 404B is mounted on the first member A1 of the second boom arm assembly 246. In the embodiment illustrated, the first camera 404A is mounted near a free end of the first member A1 of the first boom arm assembly 244, and the second camera 404B is mounted near a free end of the first member A1 of the second boom arm assembly 246. The simulation technician 194 (see FIGS. 1 and 2) uses the first and second upright support assemblies 240 and 242, the boom arm assemblies 244 and 246, and the connectors 250 and 252, respectively, to position the first and second cameras 404A and 404B, respectively, to capture video of the simulation session for playback at the completion of the simulation session. The first and second cameras 404A and 404B are positioned by the simulation technician 194 to capture videos at two different camera angles. Each of the first and second cameras 404A and 404B may be implemented as a pan-tilt-zoom ("PTZ") camera.

Referring to FIG. 9, the camera controller 406 is positioned on the work surface 210 for use by the simulation technician 194 (see FIGS. 1 and 2). The camera controller 406 may be implemented as an analog camera controller. In the embodiment illustrated, the camera controller 406 includes a joystick 407 that may be used by the simulation technician 194 to control pan, tilt, and zoom of the each of the cameras 404A and 404B (see FIGS. 1 and 2).

In the embodiment illustrated, the one or more microphones 408 include wireless microphones 408A and 408B, which may be stored on a recharging station 409 connected to the power supply 180 (illustrated in FIGS. 3 and 5) and positioned on the work surface 210. Selected ones of the simulation participants 190 (see FIG. 1) may carry the microphones 408A and 408B during a simulation session. Alternatively, the microphones 408A and 408B may be positioned on the work surface 210, or on a surface at the simulation location 104 (see FIG. 1). The microphones 408A and 408B may each be implemented as a lavaliere microphone, a directional microphone, and the like.

Referring to FIG. 3, the video computing device 400 is stored inside the internal storage space 220 (see FIG. 4), and remains therein during the simulation session. Inside the internal storage space 220, the video computing device 400 is connected to the power supply 180 and is ready for use. Referring to FIG. 7, in the embodiment illustrated, the video computing device 400 is positioned on the lower panel 222.

Referring to FIG. 3, the video computing device 400 executes simulation capture software (e.g., SimBridge) that generates a user interface displayed by the capture control display device 410 during the simulation session. The user interface displays the video being captured by the camera(s) 404, and simulation information received from the simulation computing device 300. The video computing device 400 may also be configured (e.g., by the simulation capture software) to record information entered by the simulation technician 194 (see FIGS. 1 and 2). For example, the video computing device 400 may be configured to receive input (e.g., notations) from the simulation technician 194 identifying actions taken by the simulation participants 190 during the simulation session, and when such actions were taken.

Playback Equipment

Referring to FIG. 3, the playback equipment 170 includes the main display device 500 connected to the video computing device 400 by a communication link 502. The main display device 500 may be connected to the power supply 180 and receive power therefrom. The communication link 502 may be a wired or wireless connection. In the embodiment illustrated, the simulation capture software executing on the video computing device 400 is configured to playback the captured data on the main display device 500. Thus, the playback equipment 170 may be characterized as including the video computing device 400.

The main display device 500 is connected to the video computing device 400 on the cart 100. Further, the main display device 500 is connected to the power supply 180 on the cart 100. Thus, when the cart 100 arrives at the simulation location 104 (see FIG. 1), the playback equipment 170 is ready to use immediately after the power cable 180 is connected to the power outlet 184.

Referring to FIG. 1, the main display device 500 (e.g., a playback monitor) is mounted to and supported by the first and second upright support assemblies 240 and 242. The main display device 500 faces toward the simulation participants 190. The main display device 500 is configured to prevent the participants 190 from viewing operation of the first user input device(s) 302 (see FIG. 9) and the second user input device(s) 402 (see FIG. 9) by the simulation technician 194. In the embodiment illustrated, the main display device 500 extends across the front portion 200 of the cart 100. The main display device 500 illustrated is also tall enough to entirely or almost entirely block the participants' view of the simulation technician 194.

Turning to FIGS. 6 and 7, components of the simulation equipment 150 (see FIG. 3) and the recording equipment 160 (see FIG. 3) may be positioned inside the internal storage space 220 of the cart 100 in a manner that helps counterbalance components mounted on the front portion 200 (see FIG. 1) of the cart 100, such as those components mounted on or near the first and second upright support assemblies 240 and 242 (e.g., the camera(s) 404, the main display device 500, and the boom arm assemblies 244 and 246). For example, as illustrated in FIG. 7, the computing devices 300 and 400 may be positioned adjacent the rear doors 228A and 228B. Further, as illustrated in FIG. 6, the air compressor 304 may be positioned adjacent the rear doors 228A and 228B. Optionally, as illustrated in FIG. 5, the first and second upright support assemblies 240 and 242, the boom arm assemblies 244 and 246, and the connectors 450 and 452 may be configured to position one or more of the first members A1 (see FIG. 8) adjacent to or against a ceiling 490 at the simulation location 104 (see FIG. 1) to help prevent the cart 100 from tipping forwardly.

Method of Conducting a Simulation Session

Figure 11:
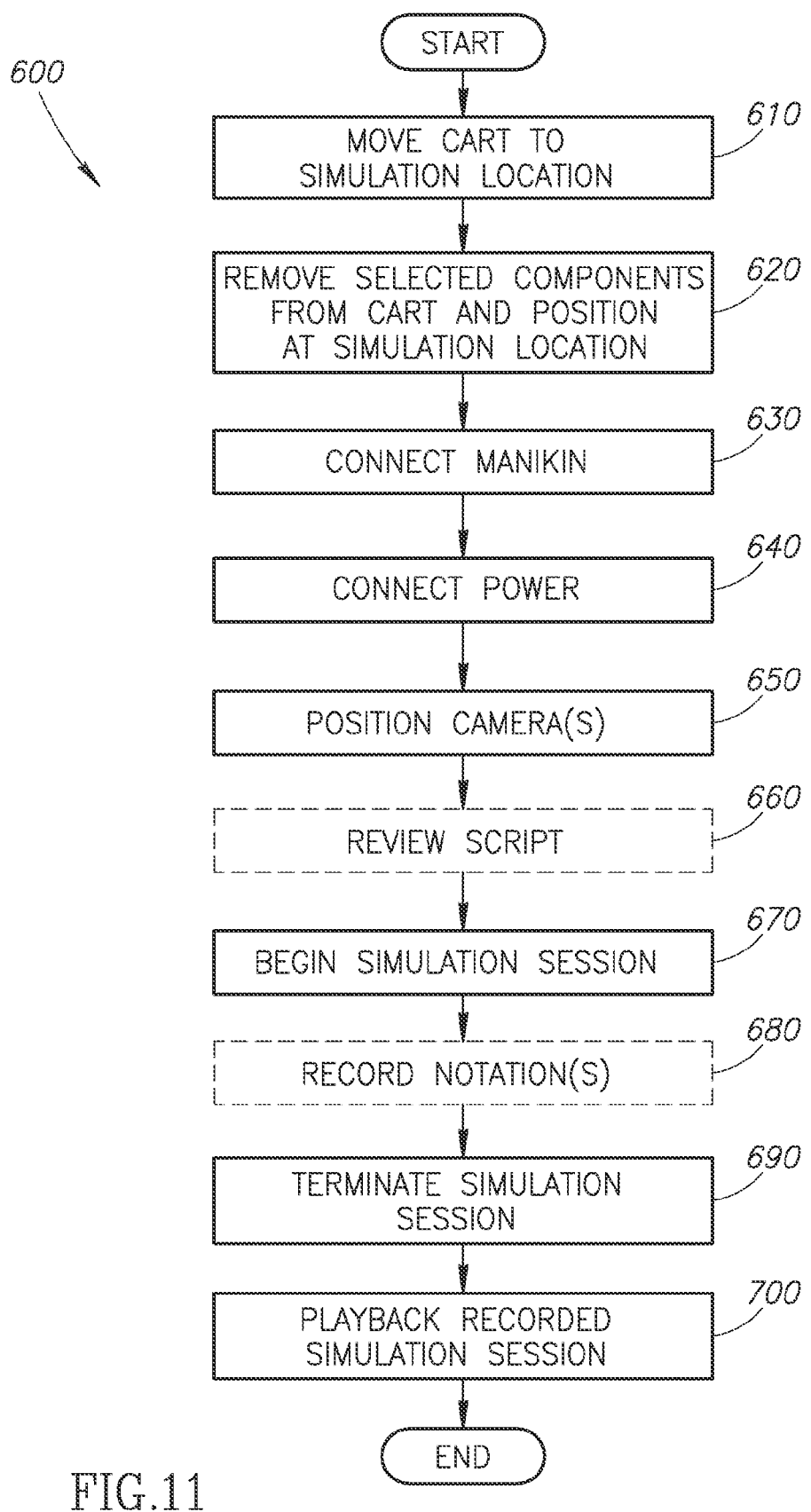
FIG. 11 is a flow diagram of a method performed by the simulation technician and/or facilitator.

FIG. 11 is a flow diagram of a method 600 of conducting a simulation session using the cart 100. In first block 610, the simulation technician 194 moves the cart 100 to the simulation location 104.

In next block 620, the simulation technician 194 removes components from the internal storage space 220 and places them in the simulation location 104. For example, the simulation technician 194 removes the patient display device 308 from the cart 100 (e.g., via one or both of the rear doors 228A and 228B) and places the patient display device 308 in a position (e.g., on the tabletop 330) viewable by the participants 190. As mentioned above, the patient display device 308 is connected to the simulation computing device 300 when stored and transported by the cart 100. Therefore, the patient display device 308 is ready to use immediately after being removed from the cart 100. If the simulation manikin 102 and the supplies 320 are stored inside the cart 100, in block 620, the simulation technician 194 removes the simulation manikin 102 and the supplies 320 from the internal storage space 220 (e.g., via one or both of the front doors 226A and 226B), and positions them in the simulation location 104. In block 620, the simulation technician 194 places the simulation manikin 102 on the patient surface 106, and the supplies 320 in a location accessible by the participants 190, the facilitator 192, and/or the simulation technician 194.

In block 630, the simulation technician 194 connects the simulation manikin 102 to the link box 306. Thus, in block 630, the simulation technician 194 connects the cable 316 to the simulation manikin 102.

In block 640, the simulation technician 194 connects the power cable 182 to the power outlet 184 at or near the simulation location 104, to thereby power up the simulation equipment 150, and the recording equipment 160. Thus, the simulation and video computing devices 300 and 400 power up, and begin executing the simulation software and simulation capture software, respectively.

In block 650, the simulation technician 194 positions the camera(s) 404 to record the simulation session. Thus, in block 650, the simulation technician 194 may adjust the first and second upright support assemblies 240 and 242, the boom arm assemblies 244 and 246, and/or the connectors 450 and 452. Further, the simulation technician 194 may position the camera(s) 404 using the camera controller 406 to capture the desired video.

At this point, set up is complete and the cart 100 is ready to conduct a simulation session, record the simulation session, and playback the recorded simulation session. Depending upon the implementation details, blocks 620-650 may be performed by a single simulation technician in under four minutes. Blocks 620-650 may be performed in any order.

Next, in optional block 660, the simulation technician 194 may select and review one of the simulation scripts 326 that outlines the simulation session to be conducted. The script may have been stored in the scenario library/file 324 (see FIG. 6) housed inside the cart 100.

When everyone is ready, in block 670, the simulation technician 194 begins the simulation session.

Optionally, whenever one of the participants 190 performs a relevant action, in optional block 680, the simulation technician 194 may enter a notation (e.g., using the second user input device(s) 402) at the time the action was performed. The simulation computing device 300 sends simulation parameter information to the video computing device 400 (via the communication link 412). The video computing device 400 records the simulation parameter information, and notations entered by the simulation technician 194 along with the video captured by the camera(s) 404, and the audio captured by the microphone(s) 408.

At the appropriate time, in block 690, the simulation technician 194 terminates the simulation session.

After the simulation session is terminated, in block 700, the simulation technician 194 and/or the facilitator 192 plays the captured information (the recorded simulation session) back to the participants 190. If necessary, the simulation technician 194 powers up the playback equipment 170 (e.g., the main display device 500). During playback, the videos, audio, simulation parameter information, and notations may be reviewed. Further, the notations may be used to jump to a particular section of the video during playback. The facilitator 192 may help guide the participants 190 through the playback to help them learn from the experience. If desired, playback may be repeated any number of times.

Then, the method 600 terminates.

After the method 600 is performed, the components removed from the cart 100 in block 620 may be returned to the cart by the simulation technician 194. The simulation technician 194 disconnects the simulation manikin 102 from the link box 306. The simulation technician 194 shuts down the simulation and video computing devices 300 and 400, and disconnects the power cable 182 from the power outlet 184. If necessary, the simulation technician 194 also retracts the first and second upright support assemblies 240 and 242, and/or the boom arm assemblies 244 and 246 (as shown in FIG. 10). Then, the simulation technician 194 moves (e.g., pushes or pulls) the cart 100 to another location (e.g., a storage location).

The cart 100 eliminates multiple trips to storage locations for equipment. Everything needed for the simulation training session is already connected and ready to be used in situ. For example, the simulation equipment 150, the recording equipment 160, and the playback equipment 170 may be ready to use in less than four minutes. Similarly, the simulation equipment 150, the recording equipment 160, and the playback equipment 170 may be torn down in less than four minutes, and wheeled out of the site of patient care.

The cart 100 has a compact footprint, and may use less than half of the space used by conventional systems offering similar functionality. The cart 100 is configured to provide immediate audio and video playback of a simulation session conducted at a selected site-of-care. Thus, after a simulation is conducted, the participants 190 can review the recording of the simulation session and participate in a debriefing session.

By conducting the simulation session in-situ, the cart 100 provides realistic simulation training opportunities for hospital clinicians (and other medical professionals). In addition, the cart 100 reduces setup time, and eliminates the need for dedicated and specialized simulation centers and travel time to such centers.

Computing Device

Figure 12:
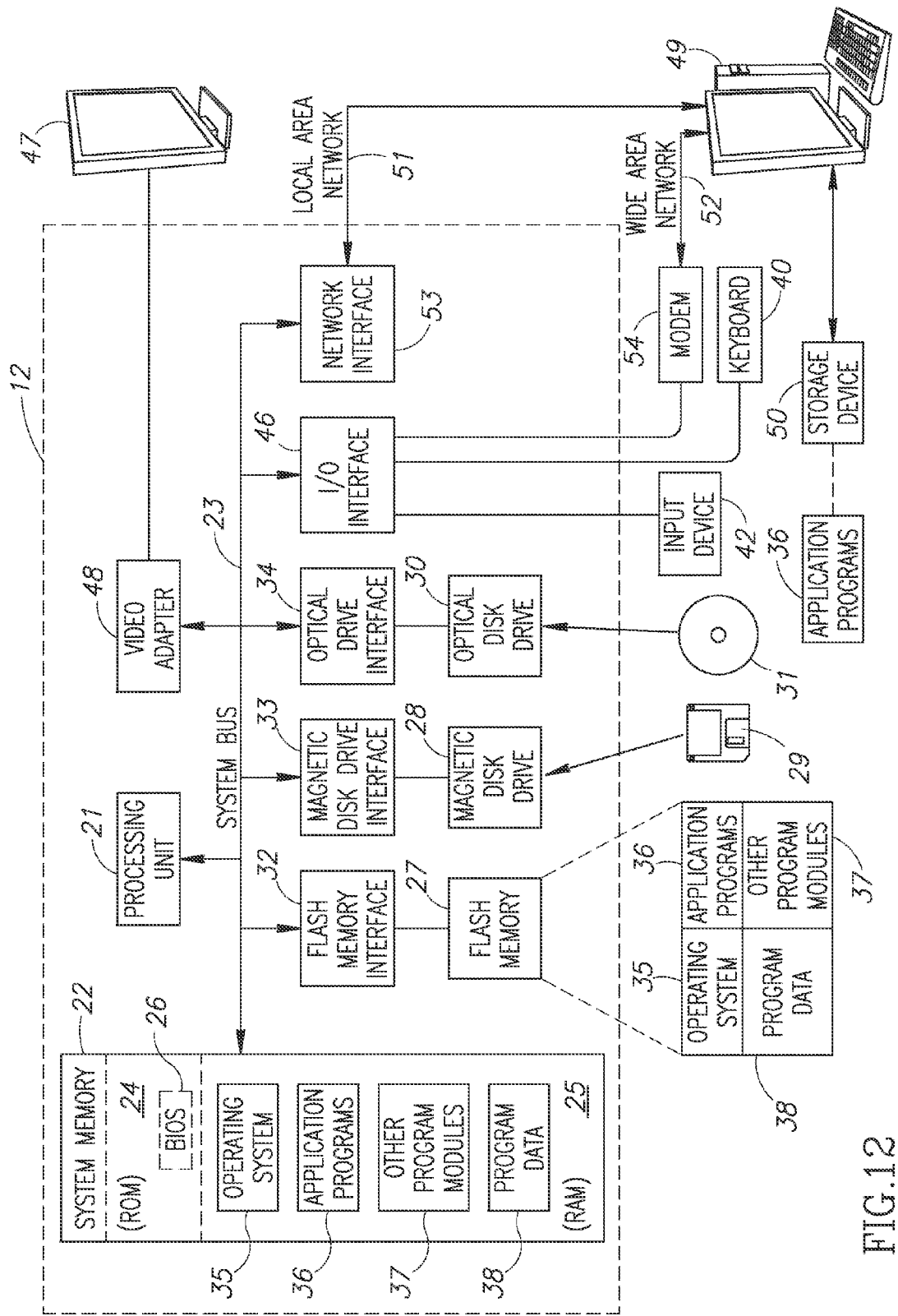
FIG. 12 is a diagram of a hardware environment and an operating environment in which the computing devices of the simulation, recording, and playback equipment may be implemented.

FIG. 12 is a diagram of hardware and an operating environment in conjunction with which implementations of the one or more computing devices (e.g., the simulation and video computing devices 300 and 400) stored by the cart 100 may be practiced. The description of FIG. 12 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 12 includes a general-purpose computing device in the form of the computing device 12. Each of the computing devices of FIG. 3 (including the simulation and video computing devices 300 and 400) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. The input devices described above may be used to implement the first user input devices 302 (see FIG. 3) and/or the second user input devices 402 (see FIG. 3). Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 12 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cart for transporting a simulation manikin, a simulation system configured to control the simulation manikin, a recording system configured to record information about a simulation session for subsequent playback, and a playback display device configured to display a playback of the recorded information, the cart comprising:
   a plurality of wheels;
   a cart body supported by the plurality of wheels, the cart body having an upper work surface, and an interior storage space configured to store the simulation manikin, the upper work surface being configured to support at least one first user input device configured to provide user input to the simulation system, and at least one second user input device configured to provide user input to the recording system;
   a first upright support assembly mounted on the cart body;
   a second upright support assembly mounted on the cart body and spaced apart from the first upright support assembly, the playback display device being mountable to the first and second upright support assemblies; and
   at least one power supply coupled to the cart body, the at least one power supply being connectable to an external power source, and configured to provide power to the simulation manikin, the simulation system, the recording system, and the playback display device.

2. The cart of claim 1, wherein the cart body comprises a bottom portion, and
   the bottom portion comprises at least one opening or cutout configured to allow one or more cables to pass therethrough.

3. The cart of claim 1, wherein the cart body comprises a bottom portion, and at least one door,
   the at least one door is configured to provide access to the interior storage space, and
   the bottom portion of the cart body comprises at least one opening or cutout positioned adjacent to the at least one door through which one or more cables pass.

4. The cart of claim 1, further comprising:
   a mounting bracket coupled to the first and second upright support assemblies, the mounting bracket being configured to mount the playback display device to the first and second upright support assemblies.

5. The cart of claim 1 for transporting the recording system comprising a first video camera and a second video camera, the cart further comprising:
   a first boom arm assembly pivotably connected to the first upright support assembly, the first camera being mountable to the first boom arm assembly and movable therewith relative to the first upright support assembly, the first boom arm assembly being configured to position the first camera at a first desired recording location; and
   a second boom arm assembly pivotably connected to the second upright support assembly, the second camera being mountable to the second boom arm assembly and movable therewith relative to the second upright support assembly, the second boom arm assembly being configured to position the second camera at a second desired recording location.

6. The cart of claim 1 for transporting the recording system comprising a recording display device, and the simulation system comprising a simulation technician display device, the cart further comprising:
   a monitor track system coupled to the first and second upright support assemblies, the monitor track system comprising a plurality of spaced apart tracks;
   a first mounting assembly coupled to one or more of the tracks of the monitor track system, the first mounting assembly being slidable within the one or more of the tracks when coupled thereto, the first mounting assembly being configured to mount the simulation technician display device on the monitor track system, the first mounting assembly being configured to position the simulation technician display device at a first viewing location; and
   a second mounting assembly coupled to at least one of the tracks of the monitor track system, the second mounting assembly being slidable within the at least one of the tracks when coupled thereto, the second mounting assembly being configured to mount the recording display device on the monitor track system, the second mounting assembly being configured to position the recording display device at a second viewing location.

7. The cart of claim 1, wherein each of the plurality of wheels comprises a wheel lock that when engaged prevents the wheel from rotating, and when disengaged allows the wheel to rotate.

* * * * *